March 16, 1965  J. ELIAS  3,173,253
FLEXIBLE FORWARD GRAIN SUPPORT
Filed Jan. 23, 1963  2 Sheets-Sheet 1

INVENTOR
Jack Elias

BY Claude Funkhouser
ATTORNEY

March 16, 1965    J. ELIAS    3,173,253
FLEXIBLE FORWARD GRAIN SUPPORT
Filed Jan. 23, 1963    2 Sheets-Sheet 2

United States Patent Office 3,173,253
Patented Mar. 16, 1965

3,173,253
FLEXIBLE FORWARD GRAIN SUPPORT
Jack Elias, Sacramento, Calif., assignor, by mesne assignments, to the United States of America as represented by the Secretary of the Navy
Filed Jan. 23, 1963, Ser. No. 253,513
2 Claims. (Cl. 60—35.6)

The present invention relates to rocket engines and more particularly to a flexible propellant support for a free standing propellant grain used in a rocket engine.

A problem exists in mounting free standing solid propellants in rocket engines. The propellant some times will tend to crack or deform due to shock loading with the result that there is improper burning of the propellant. Also, the port areas for gases on the periphery of the grain can tend to close due to the grain deformation. The result can range from the total destruction of the rocket to a loss of thrust. Therefore, once the composition of the propellant is fixed, a mounting must be provided that will offset this tendency of the grain to crack or deform under dynamic stress.

The general purpose of this invention is to provide a grain support which will deflect upon initial impact load so that grain stresses are somewhat relieved at the time of highest dynamic stress.

An object of the present invention is the provision of resilient support means which is extremely simple in design.

Another object is to provide a resilient support means which is small in size.

A further object of the invention is the provision of a propellant grain support which is safe at temperature extremes.

A still further object is to provide a flexible grain support which will relieve the dynamic stress problems by deflecting at initial impact load so that the bond between the forward grain support and the propellant grain will never fail.

Yet another object of the present invention is the provision of a grain support which will prevent the grain from bulging or deforming to the point where the port area for gases on the periphery of the grain will be closed off.

Another object is to provide a grain support which will recover to its original condition after the applied load is removed.

Another object is to provide a grain support of minimum size to permit a maximum amount of port area in the forward end for the dispersion of the igniter blast.

Another object is to allow sufficient side movement between the grain and the attachment to the case so that the bond between grain and forward support will not fail on application of side loads 90° to the centerline of the motor.

Other objects and advantages of the invention will hereinafter become more fully apparent from the following description of the accompanying drawings which illustrate a preferred embodiment of the invention.

Figure 1:
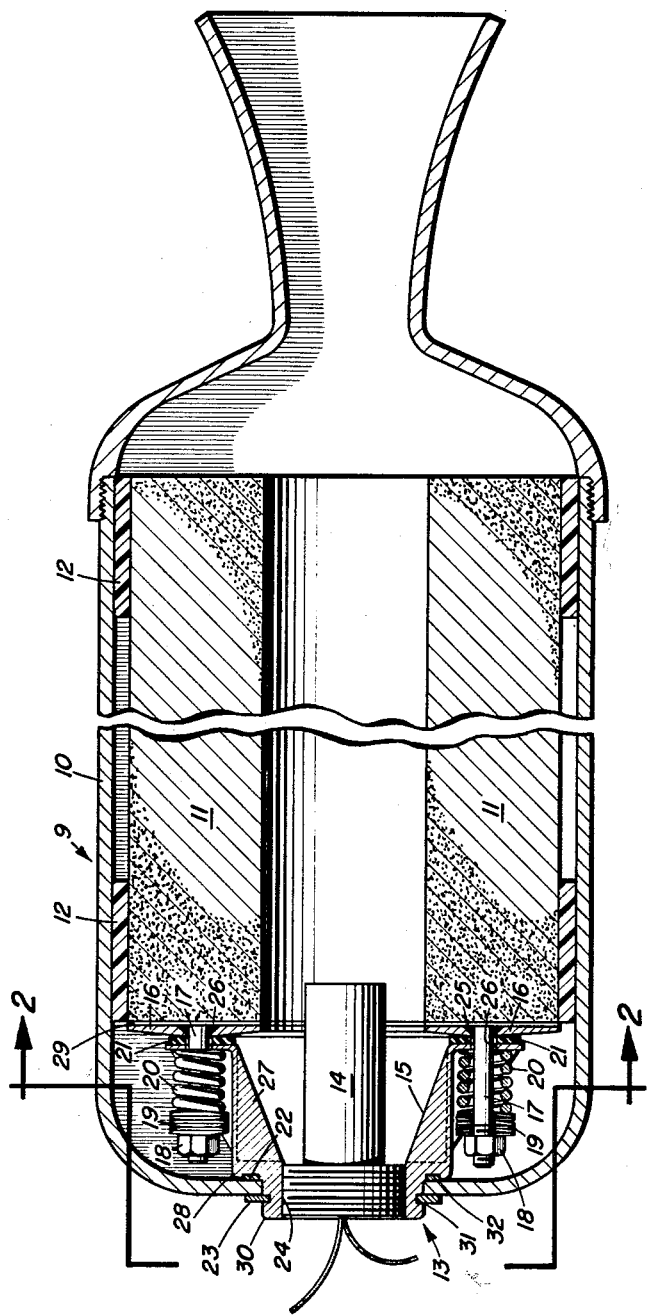
FIG. 1 is a vertical sectional view showing the flexible grain support of the instant invention installed in its customary manner in a typical rocket motor.

Referring now to the drawings wherein the like reference characters designate like or corresponding parts throughout the several views there is shown in FIG. 1 a typical rocket motor combustion chamber 9, a free-standing propellant grain 11, plastic or sponge supports for the propellant 12, a flexible forward grain support 13, and a typical igniter basket assembly 14. The rocket combustion chamber 9 is normally lined with an insulating material such as a ceramic composition. The propellant is supported by both the flexible grain support and the pair of plastic or sponge inserts 12. These inserts function as yielding, steadying and balancing cushions for the grain since the main support is by means of the flexible grain support. The forward grain support is inserted in an opening provided in the forward end (dished end) of the rocket combustion chamber and is held in place by the flanged shoulder 28 in the interior 10 of the combustion chamber 9 and by a snap ring 23 located in snap ring groove 31 on the exterior of the grain support igniter boss 30 and exterior of the rocket combustion chamber. A typical igniter basket 14 is shown threadably inserted interiorly of the grain support igniter boss. This igniter serves to ignite the propellant on firing of the rocket.

Figure 3:
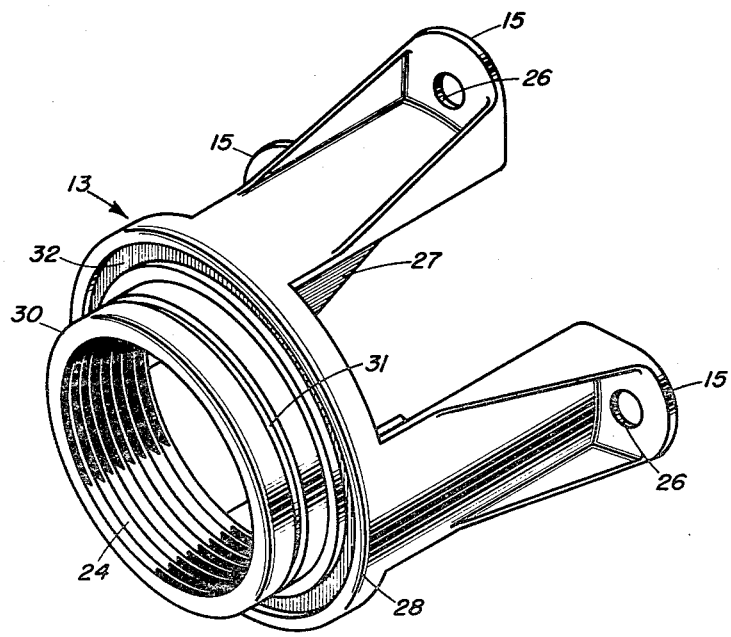
FIG. 3 is a perspective view of the grain support igniter boss and fingers.

FIG. 3 shows the support 13 with its finger-like extensions 15 in perspective and the strengthening webs 27 therefor. The fingers are centered at about 90° apart and are strengthened by the narrow web 27.

Figure 2:
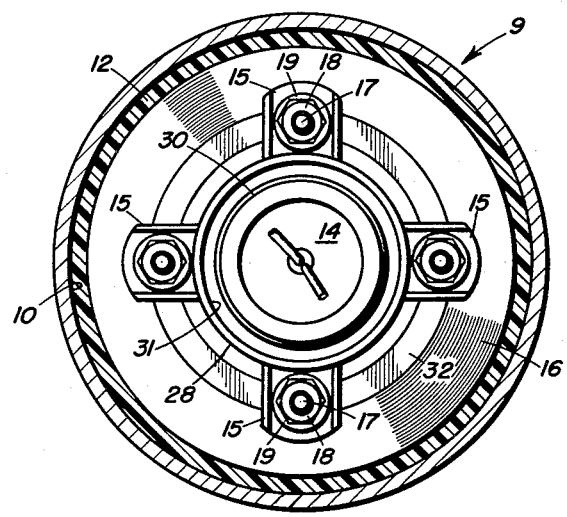
FIG. 2 is an end view of the support with the casing broken away along the line 2—2.

FIGS. 1 and 2 show the grain support in greater detail. The support 13 has an O-ring 22, in the annular O-ring groove 32 or recess at the flange portion of the shoulder 28 which acts as a seal between the rocket combustion chamber wall 10 and the shoulder 28 to seal the combustion chamber. A snap ring 23 in snap ring seat 31 locks the grain support in place. Internal threads 24 provide an engagement means for the igniter basket 14 shown inserted in FIG. 1. Blast plate assembly 16 contains 4 studs 17 welded into the blast plate at approximately 90° intervals. These studs extend through the holes 26 provided in the fingers 15 and have mounted thereon Belleville, or dish shaped spring, washers 19. Nuts 18 threadedly engage the studs to lock the Belleville washers and the springs 20 on the studs 18. Vibration washers 21 are positioned around the studs 17, between the fingers 15, and the blast plate assembly 16 to cushion movement of the blast plate. Oversize holes 26 in the fingers 15 allow side movement of the blast plate assembly on application of side loads.

In assembly the grain support is bonded onto the blast plate at the forward end of the free standing grain with a cementing agent of a character well-known in the art and of a composition that is compatible with the particular type of propellant used in the booster. The cementing agent is selected to have a bond strength at least equivalent to the tensile strength of the propellant. The blast plate studs are then fitted with washers 21 and inserted through the holes in the fingers 15. The springs 20 and Belleville washers 19 are then placed on the studs 17 and the nuts 18 installed and tightened. When expected loads are heavy the studs are fitted with additional Belleville washers and springs to give the proper deflection and rate of deflection for the expected loads. Use of springs alone for heavy loads would require springs which would have too large a diameter. The Belleville washers, on the other hand, can take relatively heavy loads in a relatively small diameter size while producing a very small deflection. A combination of springs and Belleville washers will therefore give the required deflection while absorbing the required load at an average rate that is the same as would be provided by a large diameter coil spring. The Belleville spring and washer assembly will thus be of relatively small diameter and length. The support assembly is then mounted in the dished end of the combustion chamber as described above.

In operation, upon initial thrust of the rocket motor due to ignition of the propellant or at times of unusual dynamic stresses, the forward grain support is free to deflect, i.e., the blast plate end moves away from the fingers thereby reducing the tendency to subject the grain structure to tensile stresses and, accordingly, tending to prevent breaking away of the grain from the forward blast plate. It thus obviates cracking in the grain itself. Also, the amount of deflection tending to occur in the grain is at a controlled rate since the springs and washers function to gradually compress or expand, respectively, as axial loads build up or decrease. This inhibits bulging and deformation effects tending to close off the peripheral clearances around the grain structure. As the loads decrease after initial thrust, the blast plate gradually returns to its unstressed condition.

It is to be understood that the foregoing disclosure relates to a preferred embodiment of the invention and that various modifications will be apparent to one skilled in the art to which this invention pertains and that the same may be made therein without departing from the spirit and scope of the invention as set forth in the appended claims.

What is claimed is:

1. In a rocket engine having a substantially free standing solid grain propellant normally subjected to both axial and radial forces and components thereof positioned within a generally columnar casing defining a propellant containing cavity therein and having a substantially enclosed forward end and terminating at the opposite aft end in a thrust nozzle, a propellant grain supporting system for axially supporting the grain only at the forward end thereof comprising a supporting member contiguous with and spatially fixed relative to the casing forward end and having rearwardly extending appendages terminating in radially disposed apertured flanges located proximately to the forward end of the grain to be supported, resilient cushioning means positioned between the flanges and grain, a plurality of studs each having one end affixed to the forward end of the grain and slideably extending through the apertured flanges and each terminating in an enlarged shoulder, dichotomic shock absorbers disposed on the studs between the flanges and shoulders each comprising a highly resilient section permitting deflection under light loading, and another section permitting only slight further deflection under heavier loading so as to provide suitable protective shock absorbing characteristics and controlled grain deflection when the same is submitted to both low and high levels of axially directed shock forces, thereby relieving the dynamic stresses tending to crack, deform and displace the propellant grain.

2. The structure according to claim 1 wherein the highly resilient section comprises a coil spring and the other section comprises pairs of opposed Belleville washers.

References Cited by the Examiner
UNITED STATES PATENTS

| | | | |
|---|---|---|---|
| 355,036 | 12/86 | Tait | 267—71 |
| 2,703,478 | 3/55 | Grimes et al. | 60—35.6 |
| 2,798,430 | 7/57 | Grimes | 60—35.6 |
| 2,937,493 | 5/60 | Adelman | 60—35.6 |
| 2,990,683 | 7/61 | Walden | 60—35.6 |
| 2,995,327 | 8/61 | Wood | 267—71 |
| 3,000,305 | 9/61 | Schmidt et al. | 102—49 |
| 3,077,734 | 2/63 | Adelman | 60—35.6 |

SAMUEL LEVINE, *Primary Examiner.*